United States Patent
Yamamoto et al.

(10) Patent No.: US 10,287,200 B2
(45) Date of Patent: May 14, 2019

(54) METHOD FOR TREATING BALLAST WATER AND DEVICE FOR TREATING BALLAST WATER USED THEREFOR

(71) Applicant: Panasonic Intellectual Property Management Co., Ltd., Osaka-shi, Osaka (JP)

(72) Inventors: Hiroshi Yamamoto, Osaka (JP); Akiyoshi Edagawa, Hyogo (JP); Takashi Sakakibara, Aichi (JP); Kazumi Osamura, Aichi (JP); Hideki Nagaoka, Nara (JP); Takuya Kotanagi, Osaka (JP); Hidenori Funakoshi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 886 days.

(21) Appl. No.: 14/438,069

(22) PCT Filed: Oct. 24, 2013

(86) PCT No.: PCT/JP2013/006317
§ 371 (c)(1),
(2) Date: Apr. 23, 2015

(87) PCT Pub. No.: WO2014/064942
PCT Pub. Date: May 1, 2014

(65) Prior Publication Data
US 2015/0274563 A1    Oct. 1, 2015

(30) Foreign Application Priority Data
Oct. 25, 2012    (JP) .................................. 2012-236053

(51) Int. Cl.
*C02F 1/32* (2006.01)
*C02F 9/00* (2006.01)
(Continued)

(52) U.S. Cl.
CPC ................. *C02F 9/00* (2013.01); *B63J 4/002* (2013.01); *C02F 1/008* (2013.01); *C02F 1/38* (2013.01);
(Continued)

(58) Field of Classification Search
CPC .......... C02F 9/00; C02F 1/008; C02F 1/4606; C02F 1/4674; C02F 2103/008;
(Continued)

(56) References Cited

U.S. PATENT DOCUMENTS 4,097,358 A * 6/1978 Wiseman .................. B04C 5/00
204/270
4,863,617 A * 9/1989 Katoh .................. B01D 29/356
210/788

(Continued)

FOREIGN PATENT DOCUMENTS

CN    1842495 A    10/2006
CN    101193824 A    6/2008
(Continued)

OTHER PUBLICATIONS

Ballast Water Management Systems, *Proceedings of the Global R&D Forum on Compliance Monitoring and Enforcement*, Istanbul, Turkey, Oct. 26-28, 2011, 211 pages.
(Continued)

*Primary Examiner* — Walter D. Griffin
*Assistant Examiner* — Cameron J Allen
(74) *Attorney, Agent, or Firm* — Brinks Gilson & Lione

(57) ABSTRACT

Provided are a novel method and device for treating a liquid that can be utilized for treating ballast water used in ships,
(Continued)

etc. The method and device for treating a liquid provided herein allow aquatic organisms contained in a liquid to be sufficiently inactivated or separated by being configured in such a manner as to, in supplying the liquid containing aquatic organisms, carry out at least one of an aquatic organism-inactivating treatment and a physical treatment using a centrifugal force and then store the liquid in a storage means, and in discharging the liquid thus stored, determine whether or not the aquatic organism-inactivating treatment is required, carry out the treatment based on the determination, and carry out the physical treatment using a centrifugal force.

5 Claims, 5 Drawing Sheets

(51) Int. Cl.
B63J 4/00 (2006.01)
C02F 1/38 (2006.01)
C02F 1/467 (2006.01)
C02F 1/00 (2006.01)
C02F 103/00 (2006.01)
B01D 21/26 (2006.01)
C02F 1/46 (2006.01)
C02F 1/66 (2006.01)

(52) U.S. Cl.
CPC .......... *C02F 1/4674* (2013.01); *B01D 21/267* (2013.01); *C02F 1/32* (2013.01); *C02F 1/4606* (2013.01); *C02F 1/66* (2013.01); *C02F 2103/008* (2013.01); *C02F 2209/003* (2013.01); *C02F 2209/29* (2013.01); *C02F 2209/40* (2013.01); *C02F 2303/04* (2013.01); *C02F 2303/185* (2013.01)

(58) Field of Classification Search
CPC .............. C02F 2209/29; C02F 2209/40; C02F 2303/185; C02F 1/32; C02F 1/66; C02F 2303/04; B01D 21/267
See application file for complete search history.

(56) References Cited

U.S. PATENT DOCUMENTS

| | | | |
|---|---|---|---|
| 2004/0134861 A1* | 7/2004 | Brodie | B63B 17/00 210/748.11 |
| 2007/0158208 A1 | 7/2007 | Jung et al. | |
| 2008/0164217 A1 | 7/2008 | Nishizawa et al. | |
| 2008/0277274 A1* | 11/2008 | Kim | B63B 17/06 204/275.1 |
| 2009/0127207 A1 | 5/2009 | Okamoto et al. | |
| 2010/0116647 A1 | 5/2010 | Kornmuller et al. | |
| 2013/0105375 A1 | 5/2013 | Sohn et al. | |
| 2015/0183663 A1* | 7/2015 | Kuik | C02F 1/32 210/748.11 |

FOREIGN PATENT DOCUMENTS

| | | | | |
|---|---|---|---|---|
| CN | 101484389 A | 7/2009 | | |
| CN | 201400591 Y | 2/2010 | | |
| CN | 101715431 A | 5/2010 | | |
| CN | 201770563 U | 3/2011 | | |
| GR | 1007561 B | 3/2012 | | |
| JP | 2007-144391 A | 6/2007 | | |
| JP | JPWO 2005/077833 | 10/2007 | | |
| JP | 2008-188506 A | 8/2008 | | |
| JP | 4478159 B2 | 6/2010 | | |
| JP | 2011-57048 A | 3/2011 | | |
| JP | 4723647 B2 | 7/2011 | | |
| JP | 2012-20218 A | 2/2012 | | |
| JP | 2012-106224 A | 6/2012 | | |
| KR | 10-2009-00116658 | 11/2009 | | |
| KR | 10-0982195 B1 | 9/2010 | | |
| NL | 1026928 C | 3/2006 | | |
| WO | WO-2004054932 A1 * | 7/2004 | ............ | C02F 1/4672 |
| WO | WO 2005/077833 | 8/2005 | | |
| WO | WO 2008/153809 A2 | 12/2008 | | |

OTHER PUBLICATIONS

Ballast Water Treatment Advisory, *ABS*, Apr. 2011, 60 pages.
Marine Propulsion and Auxiliary Machinery, *The Journal of Ships' Engineering Systems*, Jun. 2010, 4 pages.
Summary of Interview with the Applicant in Singapore Application No. 11201503239W, dated Mar. 10, 2017, 4 pages.
Office Action and Search Report, and English language translation of Search Report, in corresponding Chinese Application No. 201380055882.5, dated Dec. 24, 2015, 18 pages.
Written Opinion in corresponding Singapore Application No. 11201503239W, dated Apr. 8, 2016, 7 pages.
Philippine Patent Office, Office Action in Philippines Application No. 1/2015/500911, dated Mar. 7, 2018, pp. 1-4.
Extended Search Report in corresponding European Application No. 13848922.4, dated Mar. 8, 2016, 12 pages.
International Search Report, and English language translation thereof, in corresponding International Application No. PCT/JP2013/006317, dated Dec. 3, 2013, 8 pages.
Extended Search Report in corresponding European Application No. 13 848 922.4 dated Oct. 2, 2015, 12 pages.
Indian Patent Office, Examination Report in Indian Application No. 1194/MUMNP/2015 dated Mar. 27, 2018, pp. 1-8.
Search Report, and English language translation thereof, in corresponding Chinese Application No. 201380055882.5, dated Jul. 18, 2016, 5 pages.
de Vries, M. et al., "Evaluation of a New Method for Ballast Water Treatment", *Transactions of the Society of Naval Architects and Marine Engineers*, vol. 114, Jan. 1, 2007, pp. 348-354.
Extended Search Report in European Application No. 16197514.9, dated Jan. 31, 2017, 11 pages.

* cited by examiner

METHOD FOR TREATING BALLAST WATER AND DEVICE FOR TREATING BALLAST WATER USED THEREFOR

This application is a 371 application of PCT/JP2013/006317 having an international filing date of Oct. 24, 2013, which claims priority to JP 2012-236053 filed Oct. 25, 2012, the entire contents of which are incorporated herein by reference.

TECHNICAL FIELD

The present disclosure relates to a method for treating ballast water and a device for treating ballast water used therefor.

BACKGROUND ART

When ships such as tankers, large cargo ships, etc. sail with no oil or cargoes or a small amount thereof being loaded, generally they sail with ballast water stored in a ballast tank to ensure the stability and balance of the ships. Usually, the ballast water is loaded thereinto by pumping up, for example, seawater at the port of discharge and is discharged at the port of loading. Thus, since, for example, seawater of the port of discharge is used for the ballast water, the ballast water contains, for example, aquatic microorganisms living around the port of discharge, and the aquatic microorganisms are discharged together with the ballast water at the port of loading.

Methods for treating ballast water are described in, for example, Patent Document 1 and Patent Document 2. Patent Document 1 discloses an electrolysis-type apparatus for treating ballast water that is provided with an electrolytic cell for electrolyzing seawater, a circulating pump for connecting a ballast tank and the electrolytic cell, and a control unit that controls the supply of direct-current voltage to the electrolytic cell and that controls the circulating pump in such a manner as to adjust the hypochlorous acid concentration in the ballast water to annihilate marine microorganisms inside the ballast tank. Patent Document 2 discloses an electrolytic sterilizing apparatus for ship ballast water, wherein the electrodes of the first-group electrode set, which come into first contact with flowing water, are plate-shaped electrodes and the other-group electrode sets are mesh-shaped electrodes.

PRIOR ART DOCUMENTS

Patent Documents

[Patent Document 1] JP 4478159 B
[Patent Document 2] JP 4723647 B

DISCLOSURE OF INVENTION

Problem to be Solved by the Invention

As described above, International Convention for the Control and Management of Ships' Ballast Water and Sediments was adopted and requires installation of a device for treating ballast water, which resulted in more demand for new technologies that can treat ballast water. Therefore, a novel method and device for treating a liquid, which can be used for treating ballast water, are provided.

Means for Solving Problem

In one or more aspects, the present disclosure relates to a method for treating a liquid, which includes a storage step including carrying out at least one of an aquatic organism-inactivating treatment and a physical treatment using a centrifugal force, with respect to a supply liquid to be supplied to a storage means located inside a housing, and a discharge step including determining whether or not an aquatic organism-inactivating treatment is required, carrying out the treatment based on the result thus determined, and carrying out a physical treatment using a centrifugal force, with respect to a discharge liquid to be discharged outside the housing from the storage means.

In one or more aspects, the present disclosure relates to a method for treating a liquid, which includes carrying out a physical treatment using a centrifugal force with respect to a supply liquid to be supplied to a storage means located inside a housing and storing it in the storage means disposed in the housing, wherein the flow rate of the supply liquid flowing into a device for carrying out the physical treatment is 1 to 10 m/sec.

In one or more aspects, the present disclosure relates to a method for treating a liquid, which includes carrying out a physical treatment using a centrifugal force with respect to a discharge liquid to be discharged outside a housing from a storage means located inside the housing, and discharging the discharge liquid that has been subjected to the treatment outside the housing, wherein the flow rate of the discharge liquid flowing into a device for carrying out the physical treatment is 1 to 10 m/sec.

In one or more aspects, the present disclosure relates to a device for treating a liquid, which is provided with an inactivating means for carrying out an aquatic organism-inactivating treatment with respect to a supply liquid to be supplied to a storage means located inside a housing and/or a discharge liquid to be discharged outside the housing from the storage means, a physical means for carrying out a physical treatment using a centrifugal force with respect to the supply liquid to be supplied to the storage means located inside the housing and/or the discharge liquid to be discharged outside the housing from the storage means, and a control unit for determining whether or not the aquatic organism-inactivating treatment is required with respect to the discharge liquid.

In one or more aspects, the present disclosure relates to a device for treating a liquid, which is provided with a physical means for carrying out a physical treatment using a centrifugal force at an inlet flow rate of 1 to 10 m/sec with respect to a supply liquid to be supplied to a storage means located inside a housing and/or a discharge liquid to be discharged outside the housing from the storage means.

Effects of the Invention

The present disclosure can provide, in one or more embodiments, a novel method and device for treating a liquid, which can be used for treating ballast water.

DETAILED DESCRIPTION OF THE PREFERRED EMBODIMENTS

Figure 1:
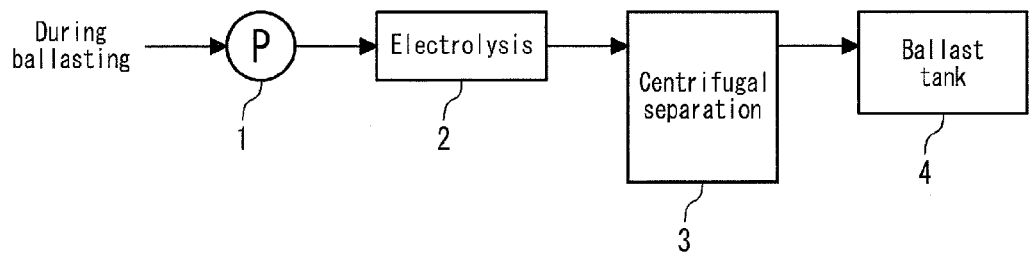
FIG. 1 is a schematic block diagram to be used for describing a method for treating ballast water in Embodiment 1.

The present disclosure may relate to one or more of the following embodiments:

<1> A method for treating a liquid, including:

a storage step including carrying out at least one of an aquatic organism-inactivating treatment and a physical treatment using a centrifugal force, with respect to a supply liquid to be supplied to a storage means located inside a housing, and a discharge step including determining whether or not an aquatic organism-inactivating treatment is required, carrying out the treatment based on the result thus determined, and carrying out a physical treatment using a centrifugal force, with respect to a discharge liquid to be discharged outside the housing from the storage means.

<2> The method according to the item <1>, wherein the inactivating treatment includes mixing a substance capable of inactivating aquatic organisms into the supply liquid or the discharge liquid.

<3> The method according to the item <2>, wherein the mixing is carried out while monitoring the concentration of the substance capable of inactivating aquatic organisms in the liquid to be treated that is mixed therewith.

<4> The method according to the item <2> or <3>, wherein the substance capable of inactivating aquatic organisms is a chlorine-containing substance.

<5> The method according to the item <4>, including electrolyzing the supply liquid or the discharge liquid to produce the chlorine-containing substance.

<6> The method according to the item <4> or <5>, including controlling the concentration of the chlorine-containing substance to be 0.1 mg/L to 20 mg/L.

<7> The method according to any one of the items <2> to <6>, wherein whether or not the inactivating treatment is required with respect to the discharge liquid is determined based on the concentration of the substance capable of inactivating aquatic organisms in the discharge liquid.

<8> The method according to the item <7>, wherein when it is determined that the inactivating treatment is required with respect to the discharge liquid, the aquatic organism-inactivating treatment is carried out with respect to the discharge liquid.

<9> The method according to any one of the items <1> to <8>, wherein the physical treatment includes separating aquatic organisms with a shell whose height is at least 50 μm from the supply liquid or the discharge liquid using a centrifugal force or stirring the supply liquid or the discharge liquid using a centrifugal force.

<10> The method according to the item <9>, wherein the flow rate of the liquid flowing into a device for carrying out the separating or stirring is 1 to 10 m/sec.

<11> The method according to any one of the items <1> to <10>, wherein the discharge step includes adding, to the discharge liquid, a neutralizer that neutralizes the substance capable of inactivating aquatic organisms.

<12> A method for treating a liquid, including carrying out a physical treatment using a centrifugal force with respect to a supply liquid to be supplied to a storage means located inside a housing and storing it in the storage means disposed in the housing, wherein the flow rate of the supply liquid flowing into a device for carrying out the physical treatment is 1 to 10 m/sec.

<13> The method according to the item <12>, wherein the physical treatment using a centrifugal force is carried out with respect to a discharge liquid to be discharged outside the housing from the storage means.

<14> The method according to the item <12> or <13>, wherein the physical treatment includes separating aquatic organisms with a shell whose height is at least 50 μm from the supply liquid or the discharge liquid using a centrifugal force or stirring the supply liquid or the discharge liquid using a centrifugal force.

<15> The method according to any one of the items <12> to <14>, including carrying out an aquatic organism-inactivating treatment with respect to the supply liquid and/or the discharge liquid.

<16> The method according to the item <15>, wherein the substance capable of inactivating aquatic organisms is a chlorine-containing substance.

<17> The method according to the item <16>, including electrolyzing the supply liquid or the discharge liquid to produce the chlorine-containing substance.

<18> The method according to any one of the items <15> to <17>, including determining the addition of a neutralizer that neutralizes the substance capable of inactivating aquatic organisms based on the concentration of the substance capable of inactivating aquatic organisms in the discharge liquid.

<19> The method according to the item <18>, including measuring the concentration of the substance capable of inactivating aquatic organisms in the discharge liquid.

<20> A method for treating a liquid, including carrying out a physical treatment using a centrifugal force with respect to a discharge liquid to be discharged outside a housing from a storage means located inside the housing, and discharging the discharge liquid that has been subjected to the treatment outside the housing, wherein the flow rate of the discharge liquid flowing into a device for carrying out the physical treatment is 1 to 10 m/sec.

<21> The method according to the item <20>, wherein the physical treatment includes separating aquatic organisms with a shell whose height is at least 50 μm from a supply liquid or the discharge liquid using a centrifugal force or stirring the supply liquid or the discharge liquid using a centrifugal force.

<22> The method according to the item <20> or <21>, including carrying out an aquatic organism-inactivating treatment with respect to the supply liquid and/or the discharge liquid.

<23> The method according to the item <22>, wherein the substance capable of inactivating aquatic organisms is a chlorine-containing substance.

<24> The method according to the item <23>, including electrolyzing the supply liquid or the discharge liquid to produce the chlorine-containing substance.

<25> The method according to any one of the items <22> to <24>, including determining the addition of a neutralizer that neutralizes the substance capable of inactivating aquatic organisms based on the concentration of the substance capable of inactivating aquatic organisms in the discharge liquid.

<26> The method according to the item <25>, including measuring the concentration of the substance capable of inactivating aquatic organisms in the discharge liquid.

<27> The method according to any one of the items <1> to <26>, wherein the storage means is a ballast tank.

<28> A device for treating a liquid, including:

an inactivating means for carrying out an aquatic organism-inactivating treatment with respect to a supply liquid to be supplied to a storage means located inside a housing and/or a discharge liquid to be discharged outside the housing from the storage means, a physical means for carrying out a physical treatment using a centrifugal force with respect to the supply liquid to be supplied to the storage means located inside the housing and/or the discharge liquid to be discharged outside the housing from the storage means, and a control unit for determining whether or not the aquatic organism-inactivating treatment is required with respect to the discharge liquid.

<29> The device according to the item <28>, wherein the inactivating means includes a means for mixing a substance capable of inactivating aquatic organisms.

<30> The device according to the item <29>, further including a monitoring means for monitoring the concentration of the substance capable of inactivating aquatic organisms in the supply liquid and the storage means, wherein the control unit controls the mixing means based on the concentration obtained by the monitoring means.

<31> The device according to the item <29> or <30>, wherein the substance capable of inactivating aquatic organisms is a chlorine-containing substance.

<32> The device according to the item <31>, wherein the inactivating means is provided with a treatment tank for producing the chlorine-containing substance from the supply liquid or the discharge liquid.

<33> The device according to the item <32>, wherein the treatment tank is provided with an electrolytic cell for electrolyzing the supply liquid or the discharge liquid to produce the chlorine-containing substance.

<34> The device according to any one of the items <29> to <33>, further including a neutralizing means for adding, to the discharge liquid, a neutralizer that neutralizes the substance capable of inactivating aquatic organisms.

<35> The device according to any one of the items <28> to <34>, wherein the physical means is a separation or stirring means using a centrifugal force.

<36> A device for treating a liquid, including a physical means for carrying out a physical treatment using a centrifugal force at an inlet flow rate of 1 to 10 m/sec with respect to a supply liquid to be supplied to a storage means located inside a housing and/or a discharge liquid to be discharged outside the housing from the storage means.

<37> The device according to the item <36>, wherein the physical means is a separation or stirring means using a centrifugal force.

<38> The device according to the item <36> or <37>, further including an inactivating means for carrying out an aquatic organism-inactivating treatment with respect to the supply liquid to be supplied to the storage means located inside the housing and/or the discharge liquid to be discharged outside the housing from the storage means.

<39> The device according to the item <38>, wherein the inactivating means includes a means for mixing a substance capable of inactivating aquatic organisms.

<40> The device according to the item <39>, wherein the substance capable of inactivating aquatic organisms is a chlorine-containing substance.

<41> The device according to the item <40>, wherein the inactivating means is provided with a treatment tank for producing the chlorine-containing substance from the supply liquid or the discharge liquid.

<42> The device according to the item <41>, wherein the treatment tank is provided with an electrolytic cell for electrolyzing the supply liquid or the discharge liquid to produce the chlorine-containing substance.

<43> The device according to any one of the items <39> to <42>, further including a neutralizing means for adding, to the discharge liquid, a neutralizer that neutralizes the substance capable of inactivating aquatic organisms.

<44> A method for treating a liquid, including:

carrying out an aquatic organism-inactivating treatment by electrolyzing a liquid taken in from outside a housing to produce a chlorine-containing substance, carrying out a separation treatment using a centrifugal force with respect to the treated liquid that has been subjected to the inactivating treatment, and storing a supernatant obtained by the separation treatment in a storage means located inside the housing.

<45> A method for treating a liquid, including:

carrying out an aquatic organism-inactivating treatment by discharging a liquid stored in a storage means located inside a housing from the storage means and electrolyzing the liquid thus discharged to produce a chlorine-containing substance, carrying out a separation treatment using a centrifugal force with respect to the treated liquid that has been subjected to the inactivating treatment, and discharging a supernatant obtained by the separation treatment to the outside of the housing, wherein the method includes, between the inactivating treatment and the separation treatment or between the separation treatment and the discharging to the outside of the housing, mixing a neutralizer that neutralizes the chlorine-containing substance.

<46> A method for treating a liquid, including:

a storage step including:

carrying out an aquatic organism-inactivating treatment A by electrolyzing a liquid taken in from outside a housing to produce a chlorine-containing substance, carrying out a separation treatment A using a centrifugal force with respect to the treated liquid that has been subjected to the inactivating treatment A, and storing a supernatant obtained by the separation treatment A in a storage means located inside the housing, and a discharge step including:

carrying out an aquatic organism-inactivating treatment B by electrolyzing the liquid discharged from the storage means located inside the housing to produce a chlorine-containing substance, carrying out a separation treatment B using a centrifugal force with respect to the treated liquid that has been subjected to the inactivating treatment B, discharging a supernatant obtained by the separation treatment B to the outside of the housing, and mixing a neutralizer that neutralizes the chlorine-containing substance, between the inactivating treatment B and the separation treatment B or between the separation treatment B and the discharging to the outside of the housing.

In the present specification, in one or more embodiments that are not particularly limited, examples of the "housing" include ships and preferably ships in general that are equipped with a ballast tank. In one or more of embodiments that are not particularly limited, examples of the ships in general that are equipped with a ballast tank include container ships, ro-ro ships, tankers, bulk carriers, chemical ships, and car carriers. In the present specification, the "storage means located inside a housing" is not limited as long as it is disposed inside a housing and capable of storing at least a liquid, and in one or more embodiments that are not particularly limited, examples thereof include ballast tanks and bilge tanks.

In the present specification, in one or more embodiments that are not particularly limited, the "supply liquid to be supplied to a storage means" is a liquid taken in from outside a housing and supplied to a storage means, and examples thereof include a liquid stored in a ballast tank as ballast water in a ballasting step. In one or more embodiments that are not particularly limited, examples of the water taken in from outside a housing include seawater, brackish water, and freshwater. In the present specification, in one or more embodiments that are not particularly limited, examples of "a discharge liquid to be discharged from a storage means to the outside of a housing" include ballast water to be discharged from a ballast tank to the outside of a housing in a deballasting step.

In the present specification, in one or more embodiments, examples of "aquatic organisms" include microorganisms living in the sea, a river, a lake, etc. and in addition, relatively micro-sized aquatic organisms such as yeast, mold, phytoplankton or zooplankton, eggs and spores of planktons, bacteria, fungi, viruses, algae, larvae of shellfishes such as conches and bivalves, larvae of crustaceans such as crabs, etc. Furthermore, examples thereof can include microorganisms and the above-mentioned aquatic organisms that may live in an estuary, a river, a canal, etc. that are connected to the sea.

In the present specification, in one or more embodiments, the "aquatic organism-inactivating treatment" denotes to destroy, kill or wound, kill, or sterilize at least a part of aquatic organisms contained in a supply liquid or a discharge liquid (hereinafter, the supply liquid and the discharge liquid that are to be subjected to the treatment are also referred to together as a "liquid to be treated"), preferably, for example, to destroy, kill or wound, or sterilize, by a chemical treatment, at least a part of aquatic organisms contained in a liquid to be treated. In one or more non-limiting embodiments, the aquatic organism-inactivating treatment can be carried out by, for example, mixing a substance capable of inactivating aquatic organisms into a liquid to be treated and irradiating the liquid to be treated with ultraviolet rays. Furthermore, the mixing may be carried out while monitoring the concentration of the substance capable of inactivating aquatic organisms in the liquid to be treated, into which the substance is to be mixed. In the present specification, in one or more embodiments, examples of the "substance capable of inactivating aquatic organisms" include hydrogen peroxide, ozone, a chlorine-containing substance, and reactive oxygen species. In one or more embodiments, examples of the chlorine-containing substance include substances containing, for example, hypochlorous acid, chlorous acid, and chloric acid, as well as ions and salts thereof. In one or more embodiments, the aquatic organism-inactivating treatment can include a chlorine treatment using a chlorine-containing substance. The inactivating treatment A is a treatment to be carried out with respect to a liquid taken in from outside a housing, while the inactivating treatment B is a treatment to be carried out with respect to a liquid discharged from a storage means located inside the housing.

In one or more embodiments, mixing of a chlorine-containing substance into a liquid to be treated can be carried out by, for example, electrolyzing the liquid to be treated to produce a chlorine-containing substance. In one or more embodiments, electrolyzing can be carried out using an electrolysis unit 2. In one or more embodiments that are not particularly limited, the electrolysis unit 2 used for a method for treating ballast water of the present disclosure is provided with an electrolytic cell and a power unit. In one or more embodiments that are not particularly limited, the electrolytic cell is configured in such a manner that a plurality of electrodes (for example, an anode and a cathode) are arranged therein, the electrodes are electrically connected to a power unit and are supplied with direct current voltage, and thereby electrolysis is carried out. The shape of the electrodes is not particularly limited and can be any one of a rectangular shape, a circular shape, a cylindrical shape, etc., and the electrode surface may be flat-shaped or mesh-shaped. The electrode material is not particularly limited but is preferably titanium or stainless steel and more preferably the anode is coated with a platinum-based metal composite alloy. The voltage between the electrodes in the electrolysis unit 2 is not particularly limited but in one or more embodiments, the voltage between the electrodes is 5 V to 500 V per $m^2$ of electrode area. Preferably, the electrolysis is carried out with respect to the whole amount of ballast water. It is possible to carry out the electrolysis with respect to part of the ballast water to produce a chlorine-containing substance and then put it into the rest of the ballast water. In this case, however, a higher concentration of chlorine compounds must be produced as compared to the case where the electrolysis is carried out with respect to the whole amount of ballast water, and the electrolysis unit 2 is required to carry out a circulating treatment and a cooling treatment. Furthermore, a feeder for feeding the substance to the rest of the ballast water is additionally required.

It is preferable that in one or more embodiments, mixing a chlorine-containing substance into a liquid to be treated be carried out in such a manner that based on the concentration of the chlorine-containing substance measured at the end of water supply, the concentration of the chlorine-containing substance in a supply liquid stored in a storage means is at least 0.1 mg/L and it is 20 mg/L or lower in terms of reducing the impact on epoxy coatings of pipes, the storage means, etc. In one or more embodiments, mixing of a chlorine-containing substance into a liquid to be treated may include controlling the concentration of the chlorine-containing substance to be 0.1 mg/L to 20 mg/L.

In the present specification, in one or more embodiments that are not particularly limited, examples of the "physical treatment using a centrifugal force" include separating or collecting, from a liquid to be treated, at least part of aquatic organisms contained in the liquid to be treated, using a centrifugal force. When the physical treatment using a centrifugal force is carried out, for example, aquatic organisms that are difficult to be inactivated by the aquatic organism-inactivating treatment can be separated or collected efficiently. In one or more embodiments, examples of the aquatic organisms to be separated or collected include aquatic organisms with a shell whose height is at least 50 μm and aquatic organisms with a shell whose aspect ratio (shell length/shell height) is 0.1 to 10. In the present disclosure, in one or more embodiments, a phrase "with a shell" denotes a shell covering the outside of a shellfish and a hard substance composed of calcareous, etc. In one or more embodiments, examples of the aquatic organisms with a shell whose height is at least 50 μm include bivalves (Pelecypoda) and conches (Gastropoda) with a shell height of at least 50 μm. In the present disclosure, the "shell height" denotes the longest linear length from the upper end (usually, the apex of the shell) to the lower end of a shell. In the present disclosure, the "shell length" denotes the longest linear length from the front end to the rear end of a shell. Furthermore, the separation treatment A is a treatment that is carried out with respect to a treated liquid that has been subjected to the inactivating treatment A, while the separation treatment B is a treatment that is carried out with respect to a treated liquid that has been subjected to the inactivating treatment B.

In one or more embodiments, the physical treatment using a centrifugal force can be carried out by, for example, stirring a liquid to be treated using a centrifugal force and separating the liquid to be treated into a supernatant and a concentrated liquid using a centrifugal force. In one or more embodiments, stirring of the liquid to be treated using a centrifugal force can be carried out using a line mixer, a liquid cyclone, etc. In one or more embodiments, separation of the liquid to be treated using a centrifugal force can be carried out using a liquid cyclone.

In the present specification, in one or more embodiments, the "supernatant" denotes a separated liquid with a lower solid content concentration of separated liquids obtained by a treatment for separating a liquid to be treated using a centrifugal force. In the present specification, in one or more embodiments, the "concentrated liquid" denotes a separated liquid with a higher solid content concentration than that of the supernatant of the separated liquids obtained by the treatment for separating a liquid to be treated using a centrifugal force. In one or more embodiments, examples of the solid contents include aquatic organisms with a shell whose height is at least 50 μm and/or aquatic organisms with a shell whose aspect ratio (shell length/shell height) is 0.1 to 10, as well as scales.

In one or more embodiments, the maximum amount of the liquid to be treated in a liquid cyclone is not particularly limited but is preferably 1 m³/hr to 10000 m³/hr and further preferably 10 m³/hr to 1000 m³/hr in terms of the installation space inside a ship. When a larger amount of the liquid to be treated than that is required, it is preferable to install multiple lines of liquid cyclones. In one or more embodiments, the casing size of the liquid cyclone is not particularly limited but is preferably 0.001 to 0.1 m in diameter and 0.003 m to 0.3 m in height per amount of a liquid to be treated of 1 m³/hr in terms of the installation space inside a ship. In one or more embodiments, the difference between the inlet pressure and the outlet pressure in the liquid cyclone (hereinafter, referred to as a pressure loss) is preferably 0.01 MPa to 1 MPa and further preferably 0.01 to 0.1 MPa in terms of the required pump head of the pump for delivering a liquid to be treated to the liquid cyclone. In one or more embodiments, the inlet flow rate in the liquid cyclone is preferably 0.1 to 100 m/sec and more preferably 1 to 10 m/sec, from the viewpoints of obtaining sufficient separation performance by a centrifugal force and controlling the required pump head of the pump according to an increase in the pressure loss. From the viewpoints of controlling the increase in the amount of a liquid to be treated for obtaining a required amount of a supernatant and controlling the increase in the capacity of the pump that results therefrom, the amount of a concentrated liquid is preferably not more than 10% of that of the liquid to be treated. Furthermore, the concentrated liquid may be discharged continuously from the lower part of the liquid cyclone, or it may be discharged intermittently by being controlled after once being stored in a dust bunker connected to the cyclone lower part. When the concentrated liquid is discharged intermittently, preferably it is discharged before the dust bunker is filled up from the viewpoint of preventing the concentrated liquid from being taken up. The interval for discharging the concentrated liquid is not particularly limited but can be, for example, an interval of 1 to 120 minutes in one or more embodiments. The place for discharging the concentrated liquid is not particularly limited. It may be stored in a tank other than the ballast tank or may be discharged outside the ship. Furthermore, it may be included that the concentrated liquid is electrolyzed to produce a high concentration of a chlorine-containing substance and thereby aquatic organisms contained in the concentrated liquid are inactivated, which then is supplied to the ballast tank. This allows the amount of the concentrated liquid to be discharged to be reduced or to be zero.

Figure 11:
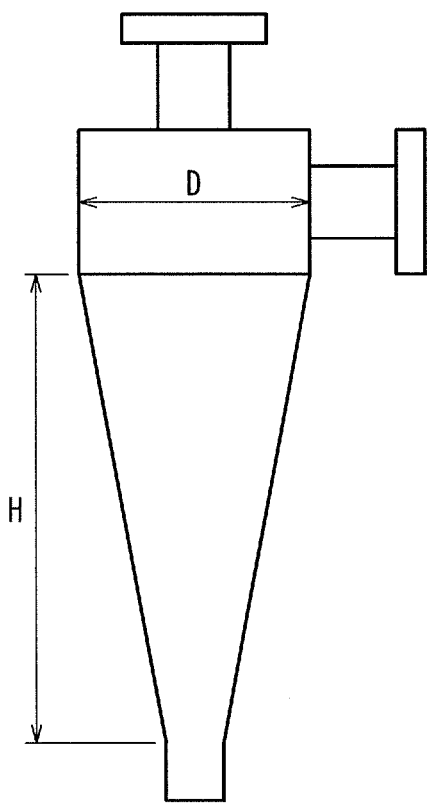
FIG. 11 is a schematic view to be used for describing the configuration of a liquid cyclone.

In the liquid cyclone, preferably the length of the conical portion (H in FIG. 11) is longer than the diameter of the cylindrical portion (D in FIG. 11) since this can improve the centrifugal separation effect and the sedimentation of objects to be separated, which allows the separation performance to be improved. In one or more embodiments, the ratio (H/D) of the length (H) of the conical portion to the diameter (D) of the cylindrical portion is 2 to 15, preferably 2 to 6.

Figure 12:
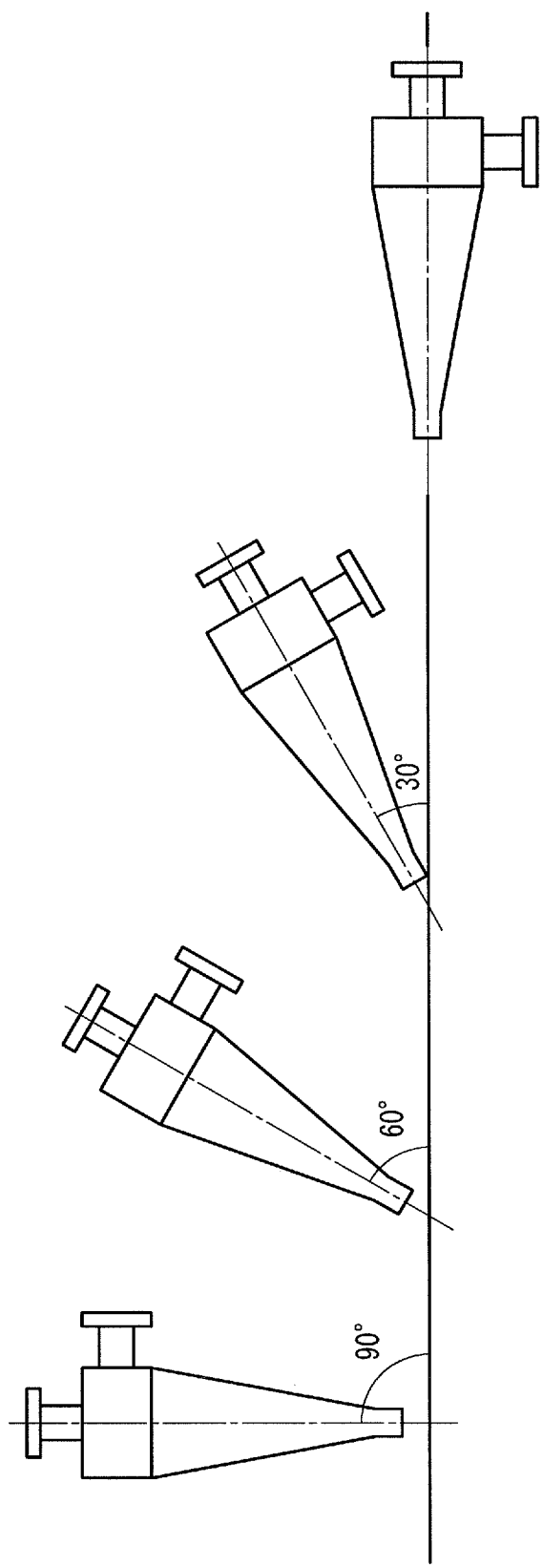
FIG. 12 is a schematic view to be used for describing the setting angle of the liquid cyclone.

In one or more embodiments, the liquid cyclone may be disposed in such a manner that the central axis of the liquid cyclone forms an arbitrary angle between 0 and 90 degrees with respect to the horizontal plane as shown in FIG. 12. In this case, the "horizontal plane" denotes the floor surface inside a ship. In embodiments of the present disclosure, the liquid cyclone is disposed in such a manner that the central axis is arranged at 90 degrees (perpendicular direction) with respect to the horizontal plane unless otherwise specifically disclosed.

Hereinafter, the present disclosure is described in detail with reference to preferred embodiments. However, the present disclosure is not limited to the following embodiments.

Embodiment 1

FIG. 1 is a schematic diagram for describing a method for treating ballast water in Embodiment 1 of the present disclosure. The method for treating ballast water in Embodiment 1 is an embodiment of the method for treating a liquid (ballast water) during ballasting (a storage step).

As shown in FIG. 1, a device for treating ballast water that is used for the method for treating ballast water of Embodiment 1 is provided with an electrolysis unit 2 and a centrifugal separator 3. The electrolysis unit 2 is connected to a ballast pump 1 at its one end and to the centrifugal separator 3 at its other end. The centrifugal separator 3 is connected to the electrolysis unit 2 at its one end and to a ballast tank 4 at its other end. The device for treating ballast water shown in FIG. 1 is configured in such a manner that a liquid taken in from outside a housing is subjected to an inactivating treatment by the electrolysis unit 2 and then a physical treatment using a centrifugal force by the centrifugal separator 3, which is thereafter supplied to the ballast tank 4. According to the method for treating ballast water of Embodiment 1, since the treated liquid that has been subjected to the inactivating treatment by the electrolysis unit 2 is introduced into the centrifugal separator 3, a chlorine-containing substance produced in the electrolysis unit 2 is stirred well in the centrifugal separator 3. Furthermore, for example, scales peeled from the electrodes of the electrolysis unit 2 are separated in the centrifugal separator 3, which can prevent them from being accumulated in the ballast tank 4. According to the method for treating ballast water of Embodiment 1, since the inactivating treatment by the electrolysis unit 2 is carried out during ballasting (the storage step), propagation or growth of aquatic organisms in the ballast tank 4 can be prevented. According to the method for treating ballast water of Embodiment 1, since the physical treatment using a centrifugal force by the centrifugal separator 3 is carried out, even when no filter is used, for example, even when highly chlorine-resistant aquatic organisms are contained, the ballast water can be treated sufficiently to the level that meets the ballast water discharge standard.

An embodiment of the treatment of ballast water of Embodiment 1 is described.

First, a liquid taken in from outside a housing by the ballast pump 1 is introduced into the electrolysis unit 2 and the liquid is electrolyzed in the electrolysis unit 2. The electrolysis allows a chlorine-containing substance such as hypochlorous acid to be produced, and an inactivating treatment using the chlorine-containing substance is carried out. The electrolysis may be carried out while monitoring the concentration of the chlorine-containing substance contained in the ballast water stored in the ballast tank 4. For example, it may be included that the electrolysis unit 2 is controlled in such a manner that the chlorine-containing substance contained in the ballast water stored in the ballast tank 4 has a concentration of 0.1 mg/L to 20 mg/L. The point at which the concentration of the chlorine-containing substance is monitored may be any one of the points after the electrolysis unit 2, after the centrifugal separator 3, inside the ballast tank 4, and after the ballast tank 4.

Next, the treated liquid containing the chlorine-containing substance produced by electrolysis is introduced into the centrifugal separator 3. In the centrifugal separator 3, a stirring-separation treatment is carried out using a centrifugal force to separate the treated liquid into a supernatant and a concentrated liquid and then the supernatant is supplied to the ballast tank 4. With the separation treatment carried out by the centrifugal separator 3, for example, aquatic organisms with a shell such as shellfishes, preferably aquatic organisms with a shell whose height is at least 50 μm, aquatic organisms with a shell whose aspect ratio is 0.1 to 10, etc., are separated/collected in the concentrated liquid. From the viewpoint of efficiently separating aquatic organisms with a shell whose height is at least 50 μm, the inlet flow rate in the centrifugal separator 3 (for example, a liquid cyclone) is preferably 1 to 10 m/sec.

Embodiment 2

Figure 2:
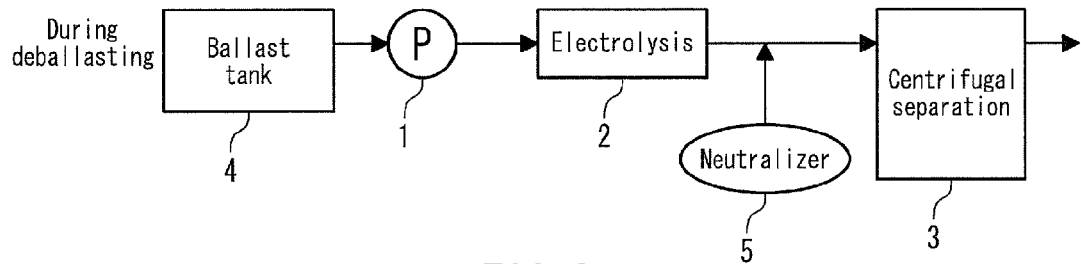
FIG. 2 is a schematic block diagram to be used for describing a method for treating ballast water in Embodiment 2.

FIG. 2 is a schematic diagram for describing a method for treating ballast water in Embodiment 2 of the present disclosure. The method for treating ballast water in Embodiment 2 is an embodiment of the method for treating a liquid (deballast water) during deballasting (a discharge step).

As shown in FIG. 2, a device for treating ballast water that is used for the method for treating ballast water of Embodiment 2 is provided with an electrolysis unit 2, a neutralizer addition means 5, and a centrifugal separator 3. The electrolysis unit 2 is connected to a ballast tank 4 at its one end and to the centrifugal separator 3 at its other end. The centrifugal separator 3 is connected to the electrolysis unit 2 at its one end and to the outside of the housing at its other end. The device for treating ballast water shown in FIG. 2 is configured in such manner that after the ballast water stored in the ballast tank 4 is subjected to an inactivating treatment by the electrolysis unit 2, a neutralizer is added thereto, a physical treatment using a centrifugal force is carried out by the centrifugal separator 3, and then the ballast water thus treated is discharged outside the housing. According to the method for treating ballast water of Embodiment 2, since the treated liquid that has been subjected to the inactivating treatment by the electrolysis unit 2 and that contains the neutralizer added thereto is introduced into the centrifugal separator 3, a chlorine-containing substance produced in the electrolysis unit 2 and the neutralizer added thereto are stirred well in the centrifugal separator 3. Thus, the neutralization treatment can be carried out efficiently. Furthermore, for example, scales peeled from the electrodes of the electrolysis unit 2 are separated in the centrifugal separator 3, which can prevent them from being discharged outside the housing.

An embodiment of the treatment of ballast water of Embodiment 2 is described.

First, ballast water discharged from the ballast tank 4 is introduced into the electrolysis unit 2 and the liquid is electrolyzed in the electrolysis unit 2. The electrolysis allows a chlorine-containing substance such as hypochlorous acid to be produced, and an inactivating treatment using the chlorine-containing substance is carried out. The electrolysis may be carried out while monitoring the concentration of the chlorine-containing substance contained in the ballast water in the ballast tank 4. When it is determined that the concentration of the chlorine-containing substance contained in the ballast water inside the ballast tank 4 is high enough (for example, when it is 0.1 mg/L to 20 mg/L), electrolysis is not carried out. When it is determined that the concentration is not high enough (for example, when it is less than 0.1 mg/L), electrolysis may be carried out to produce a chlorine-containing substance.

Next, a neutralizer is added to the treated liquid containing the chlorine-containing substance produced by the electrolysis. Examples of the neutralizer include a reducing agent for the chlorine-containing substance. Examples of the reducing agent include sodium thiosulfate and sodium sulfite.

The treated liquid containing the neutralizer added thereto is introduced into the centrifugal separator 3. In the centrifugal separator 3, a stirring-separation treatment is carried out using a centrifugal force. Thus, the neutralizer and the chlorine-containing substance contained in the treated liquid are stirred and thereby the chlorine-containing substance is neutralized while the treated liquid is separated into a supernatant and a concentrated liquid. The supernatant thus separated is discharged outside the housing. With the separation treatment carried out by the centrifugal separator 3, for example, aquatic organisms with a shell such as shellfishes, preferably, aquatic organisms with a shell whose height is at least 50 µm, aquatic organisms with a shell whose aspect ratio is 0.1 to 10, etc., are separated/collected in the concentrated liquid. From the viewpoint of efficiently separating aquatic organisms with a shell whose height is at least 50 µm, the inlet flow rate in the centrifugal separator 3 (for example, a liquid cyclone) is preferably 1 to 10 m/sec.

Figure 3:
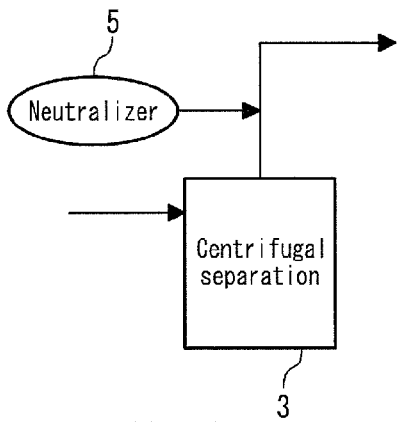
FIG. 3 is a schematic block diagram showing an example of the arrangement of a centrifugal separator and a neutralizer addition means.

In Embodiment 2, the description was made with reference to a configuration, as an example, in which a means for adding the neutralizer is connected to a pipe that connects the electrolysis unit 2 and the centrifugal separator 3 to each other, but the configuration is not limited thereto. It may be a configuration in which the neutralizer addition means 5 is connected to a pipe that connects the centrifugal separator 3 and the outside of the housing to each other. In this case, after the chlorine-containing substance was stirred well by the centrifugal separator 3 and thereby the inactivating treatment was carried out efficiently, the stirring effect of the swirling flow generated in the centrifugal separator 3 allows the neutralizer added near the outlet of the centrifugal separator 3 to react efficiently with the remaining chlorine-containing substance. Therefore, according to this configuration, the inactivating treatment using the chlorine-containing substance and the neutralizing treatment using the neutralizer can be carried out more efficiently. It is preferable that the neutralizer addition means 5 be connected to a place located immediately after the supernatant outlet of the centrifugal separator 3 from the viewpoint of efficiently utilizing the swirling flow generated in the centrifugal separator 3. FIG. 3 shows an example of the configuration of connecting the centrifugal separator 3 and the neutralizer addition means 5. Preferably, the neutralizer addition means 5 is connected to a portion extending straight from the centrifugal separator 3 of the supernatant outlet pipe of the centrifugal separator 3. When the supernatant outlet pipe of the centrifugal separator 3 includes a bent portion, it is preferable that the neutralizer addition means 5 be connected thereto on the centrifugal separator 3 side with respect the bent portion. The length of the pipe between the centrifugal separator 3 and the place to which the neutralizer addition means 5 is connected is preferably 5 m or shorter, more preferably 1 m or shorter, from the viewpoint of more efficiently utilizing the swirling flow generated in the centrifugal separator 3. Furthermore, in the case where the neutralizer is added as a solid, the stirring effect of the centrifugal separation allows it to be dissolved in water easier.

Embodiment 3

Figure 4:
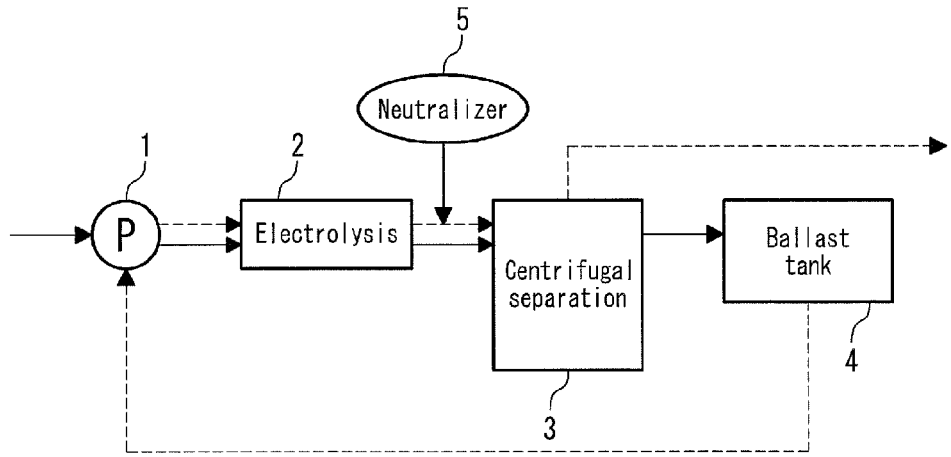
FIG. 4 is a schematic block diagram to be used for describing a method for treating ballast water in Embodiment 3.

FIG. 4 is a schematic diagram for describing a method for treating ballast water in Embodiment 3 of the present disclosure. In FIG. 4, the solid line indicates the flow of a liquid to be treated during ballasting while the broken line indicates the flow of the liquid to be treated during deballasting. In the method for treating ballast water in Embodiment 3, the ballast water treatment of Embodiment 1 is carried out during ballasting (the storage step) while the ballast water treatment of Embodiment 2 is carried out during deballasting (the discharge step).

As shown in FIG. 4, a device for treating ballast water that is used for the method for treating ballast water of Embodiment 3 is provided with an electrolysis unit 2, a neutralizer addition means 5, and a centrifugal separator 3. The electrolysis unit 2 is connected to the centrifugal separator 3 at its one end. The electrolysis unit 2 is configured in such a manner that a liquid taken in from outside a housing can be introduced thereinto through a ballast pump 1 during ballasting while ballast water discharged from a ballast tank 4 can be introduced thereinto during deballasting. The centrifugal separator 3 is connected to the electrolysis unit 2 at its one end and to the ballast tank 4 and the outside of the housing at its other end. According to the method for treating ballast water of Embodiment 3, since an inactivating treatment by the electrolysis unit 2 is carried out during ballasting (the storage step), propagation or growth of aquatic organisms in the ballast tank 4 can be prevented. According to the method for treating ballast water of Embodiment 3, since a physical treatment using a centrifugal force by the centrifugal separator 3 is carried out, even when no filter is used, for example, even when highly chlorine-resistant aquatic organisms are contained, the ballast water can be treated sufficiently to the level that meets the ballast water discharge standard. Furthermore, according to the method for treating ballast water of Embodiment 3, since the inactivating treatment by the electrolysis unit 2 is carried out during deballasting (the discharge step) and the treated liquid containing a neutralizer added thereto is introduced into the centrifugal separator 3, a chlorine-containing substance produced in the electrolysis unit 2 and the added neutralizer are stirred well in the centrifugal separator 3 and thereby the neutralizing treatment can be carried out efficiently. Moreover, for example, sludge that leaked from inside the ballast tank 4 and scales peeled from the electrodes of the electrolysis unit 2 are separated in the centrifugal separator 3, which can prevent them from being discharged outside the housing. According to the method for treating ballast water of Embodiment 3, since the inactivating treatment by the electrolysis unit 2 and the centrifugal separation treatment are carried out both during ballasting and during deballasting, propagation or growth of aquatic organisms inside the ballast tank 4 can be prevented. Even when aquatic organisms have propagated or grown inside the ballast tank 4, the aquatic organisms propagated or grew can be, for example, inactivated or separated during deballasting. Therefore, according to the method for treating ballast water of Embodiment 3, the ballast water can be treated more reliably to the level that meets the ballast water discharge standard.

In Embodiment 3, the description was made with reference to a configuration, as an example, in which a means for adding the neutralizer is connected to a pipe that connects the electrolysis unit 2 and the centrifugal separator 3 to each other, but the configuration is not limited thereto. It may be a configuration in which the neutralizer addition means 5 is connected to a pipe that connects the centrifugal separator 3 and the outside of the housing to each other. In this case, after the chlorine-containing substance was stirred well by the centrifugal separator 3 and thereby the inactivating treatment was carried out efficiently, the stirring effect of the swirling flow generated in the centrifugal separator 3 allows the neutralizer added near the outlet of the centrifugal separator 3 to react efficiently with the remaining chlorine-containing substance. Therefore, according to this configuration, the inactivating treatment using the chlorine-containing substance and the neutralizing treatment using the neutralizer can be carried out more efficiently. It is preferable that the neutralizer addition means 5 be connected to a place located immediately after the supernatant outlet of the centrifugal separator 3 from the viewpoint of efficiently utilizing the swirling flow generated in the centrifugal separator 3. As shown in FIG. 3, it is preferable that the neutralizer addition means 5 be connected, with the supernatant outlet pipe of the centrifugal separator 3 not being bent. The length of the pipe between the centrifugal separator 3 and the place to which the neutralizer addition means 5 is connected is preferably 5 m or shorter, more preferably 1 m or shorter, from the viewpoint of more efficiently utilizing the swirling flow generated in the centrifugal separator 3. Furthermore, in the case where the neutralizer is added as a solid, the stirring effect of the centrifugal separation allows it to be dissolved in water easier.

Embodiment 4

Figure 5:
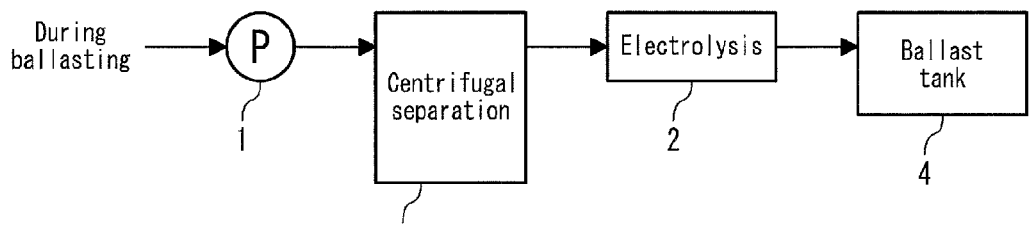
FIG. 5 is a schematic block diagram to be used for describing a method for treating ballast water in Embodiment 4.

FIG. 5 is a schematic diagram for describing a method for treating ballast water in Embodiment 4 of the present disclosure. The method for treating ballast water in Embodiment 4 is an embodiment of the method for treating a liquid (ballast water) during ballasting (the storage step).

As shown in FIG. 5, a device for treating ballast water that is used for the method for treating ballast water of Embodiment 4 is provided with an electrolysis unit 2 and a centrifugal separator 3. The centrifugal separator 3 is connected to a ballast pump 1 at its one end and to the electrolysis unit 2 at its other end. The electrolysis unit 2 is connected to the centrifugal separator 3 at its one end and to a ballast tank 4 at its other end. The device for treating ballast water shown in FIG. 5 is configured in such a manner that a liquid taken in from outside a housing is subjected to a physical treatment using a centrifugal force by the centrifugal separator 3 and then to an inactivating treatment by the electrolysis unit 2, which is thereafter supplied to the ballast tank 4. According to the method for treating ballast water of Embodiment 4, since the liquid that has been subjected to the physical treatment using a centrifugal force in the centrifugal separator 3 is introduced into the electrolysis unit 2, the efficiency in the electrolysis treatment is improved. That is, for example, aquatic organisms with a shell such as shellfishes that tend not to be annihilated by the electrolysis treatment, preferably aquatic organisms with a shell whose height is at least 50 μm, aquatic organisms with a shell whose aspect ratio is 0.1 to 10, etc. are separated in the centrifugal separator 3. Thus, a liquid free of the aquatic organisms is introduced into the electrolysis unit 2 and thereby the efficiency in the treatment using the electrolysis unit 2 can be improved. Furthermore, according to the method for treating ballast water of Embodiment 4, since the inactivating treatment by the electrolysis unit 2 is carried out during ballasting (the storage step), propagation or growth of aquatic organisms in the ballast tank 4 can be prevented. According to the method for treating ballast water of Embodiment 4, since the physical treatment using a centrifugal force by the centrifugal separator 3 is carried out, even when no filter is used, for example, even when highly chlorine-resistant aquatic organisms are contained, the ballast water can be treated sufficiently to the level that meets the ballast water discharge standard.

Figure 6:
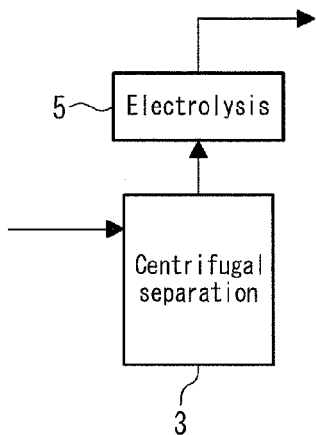
FIG. 6 is a schematic block diagram showing an example of the arrangement of a centrifugal separator and an electrolysis unit 2.

In the device for treating ballast water having the configuration of Embodiment 4, it is preferable that the electrolysis unit 2 be disposed at a place located immediately after the supernatant outlet of the centrifugal separator 3 from the viewpoint of efficiently utilizing the swirling flow generated in the centrifugal separator 3. FIG. 6 shows an example of the configuration of the centrifugal separator 3 and the electrolysis unit 2. From the viewpoint of more efficiently utilizing the swirling flow generated in the centrifugal separator 3, as shown in FIG. 6, it is preferable that the centrifugal separator 3 and the electrolysis unit 2 be connected in series to each other, with the pipe connecting them to each other not being bent. The length of the pipe between the centrifugal separator 3 and the electrolysis unit 2 is preferably 5 m or shorter, more preferably 1 m or shorter, from the viewpoint of more efficiently utilizing the swirling flow generated in the centrifugal separator 3.

An embodiment of the treatment of ballast water of Embodiment 4 is described.

First, a liquid taken in from outside a housing by the ballast pump 1 is introduced into the centrifugal separator 3. In the centrifugal separator 3, the liquid is subjected to a stirring-separation treatment using a centrifugal force to be separated into a supernatant and a concentrated liquid. With the separation treatment carried out by the centrifugal separator 3, for example, aquatic organisms with a shell such as shellfishes, preferably aquatic organisms with a shell whose height is at least 50 μm, aquatic organisms with a shell whose aspect ratio is 0.1 to 10, etc., are separated/collected in the concentrated liquid. From the viewpoint of efficiently separating aquatic organisms with a shell whose height is at least 50 μm, the inlet flow rate in the centrifugal separator 3 (for example, a liquid cyclone) is preferably 1 to 10 m/sec.

Next, the supernatant obtained in the centrifugal separator 3 is introduced into the electrolysis unit 2 and the liquid is electrolyzed in the electrolysis unit 2. The electrolysis allows a chlorine-containing substance such as hypochlorous acid to be produced and then an inactivating treatment using the chlorine-containing substance is carried out. Thereafter, the treated liquid containing the chlorine-containing substance produced by the electrolysis is supplied to the ballast tank 4. The electrolysis may be carried out while monitoring the concentration of the chlorine-containing substance contained in the ballast water stored in the ballast tank 4. For example, it may be included that the electrolysis unit 2 is controlled in such a manner that the chlorine-containing substance contained in the ballast water stored in the ballast tank 4 has a concentration of 0.1 mg/L to 20 mg/L.

Embodiment 5

Figure 7:
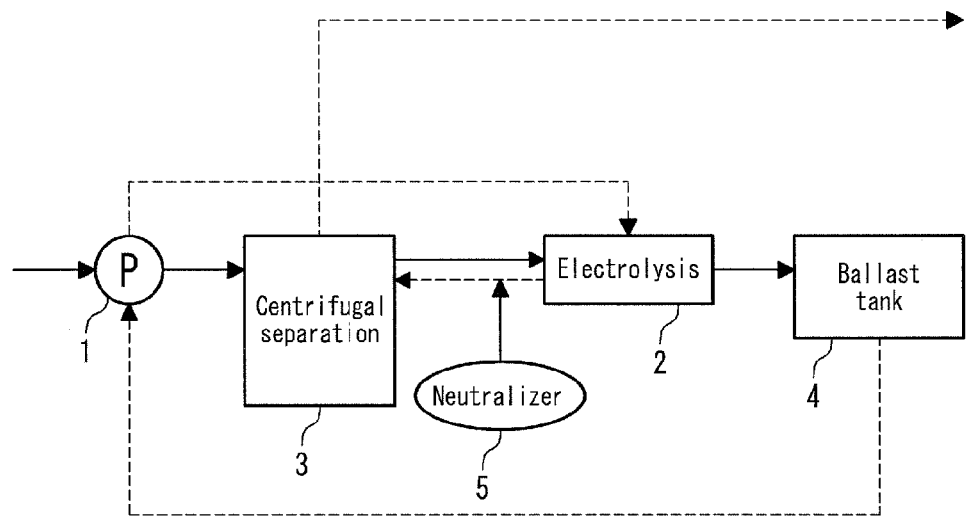
FIG. 7 is a schematic block diagram to be used for describing a method for treating ballast water in Embodiment 5.

FIG. 7 is a schematic diagram for describing a method for treating ballast water in Embodiment 5 of the present disclosure. In the method for treating ballast water in Embodiment 5, the ballast water treatment of Embodiment 4 is carried out during ballasting (the storage step) while the ballast water treatment of Embodiment 2 is carried out during deballasting (the discharge step).

As shown in FIG. 7, a device for treating ballast water that is used for the method for treating ballast water of Embodiment 5 is provided with an electrolysis unit 2, a neutralizer addition means 5, and a centrifugal separator 3. The centrifugal separator 3 is connected to a ballast pump 1 at its one end and to the electrolysis unit 2 at its other end. The electrolysis unit 2 is connected to the centrifugal separator 3 at its one end and to a ballast tank 4 at its other end. The device for treating ballast water shown in FIG. 7 is configured in such a manner that during ballasting, a liquid taken in from outside a housing is subjected to an inactivating treatment by the electrolysis unit 2 and then to a physical treatment using a centrifugal force by the centrifugal separator 3, which is thereafter supplied to the ballast tank 4, while during deballasting, the ballast water discharged from the ballast tank 4 is subjected to the inactivating treatment by the electrolysis unit 2 and then to the physical treatment using a centrifugal force by the centrifugal separator 3, which is thereafter discharged outside the housing. According to the method for treating ballast water of Embodiment 5, since the inactivating treatment by the electrolysis unit 2 is carried out during ballasting (the storage step), propagation or growth of aquatic organisms in the ballast tank 4 can be prevented. According to the method for treating ballast water of Embodiment 5, since the physical treatment using a centrifugal force by the centrifugal separator 3 is carried out, even when no filter is used, for example, even when highly chlorine-resistant aquatic organisms are contained, the ballast water can be treated sufficiently to the level that meets the ballast water discharge standard. Furthermore, according to the method for treating ballast water of Embodiment 5, since the inactivating treatment by the electrolysis unit 2 is carried out during deballasting (the discharge step) and the treated liquid containing a neutralizer added thereto is introduced into the centrifugal separator 3, a chlorine-containing substance produced in the electrolysis unit 2 and the added neutralizer are stirred well in the centrifugal separator 3 and thereby the neutralizing treatment can be carried out efficiently. Moreover, for example, sludge that leaked from inside the ballast tank 4 and scales peeled from the electrodes of the electrolysis unit 2 are separated in the centrifugal separator 3, which can prevent them from being discharged outside the housing.

In Embodiment 5, the description was made with reference to a configuration, as an example, in which a means for adding the neutralizer is connected to a pipe that connects the electrolysis unit 2 and the centrifugal separator 3 to each other, but the configuration is not limited thereto. It may be a configuration in which the neutralizer addition means 5 is connected to a pipe that connects the centrifugal separator 3 and the outside of the housing to each other. In this case, after the chlorine-containing substance was stirred well by the centrifugal separator 3 and thereby the inactivating treatment was carried out efficiently, the stirring effect of the swirling flow generated in the centrifugal separator 3 allows the neutralizer added near the outlet of the centrifugal separator 3 to react efficiently with the remaining chlorine-containing substance. Therefore, according to this configuration, the inactivating treatment using the chlorine-containing substance and the neutralizing treatment using the neutralizer can be carried out more efficiently. It is preferable that the neutralizer addition means 5 be connected to a place located immediately after the supernatant outlet of the centrifugal separator 3 from the viewpoint of efficiently utilizing the swirling flow generated in the centrifugal separator 3. As shown in FIG. 3, it is preferable that the neutralizer addition means 5 be connected, with the supernatant outlet pipe of the centrifugal separator 3 not being bent. The length of the pipe between the centrifugal separator 3 and the place to which the neutralizer addition means 5 is connected is preferably 5 m or shorter, more preferably 1 m or shorter, from the viewpoint of more efficiently utilizing the swirling flow generated in the centrifugal separator 3. Furthermore, in the case where the neutralizer is added as a solid, the stirring effect of the centrifugal separation allows it to be dissolved in water easier.

Embodiment 6

Figure 8:
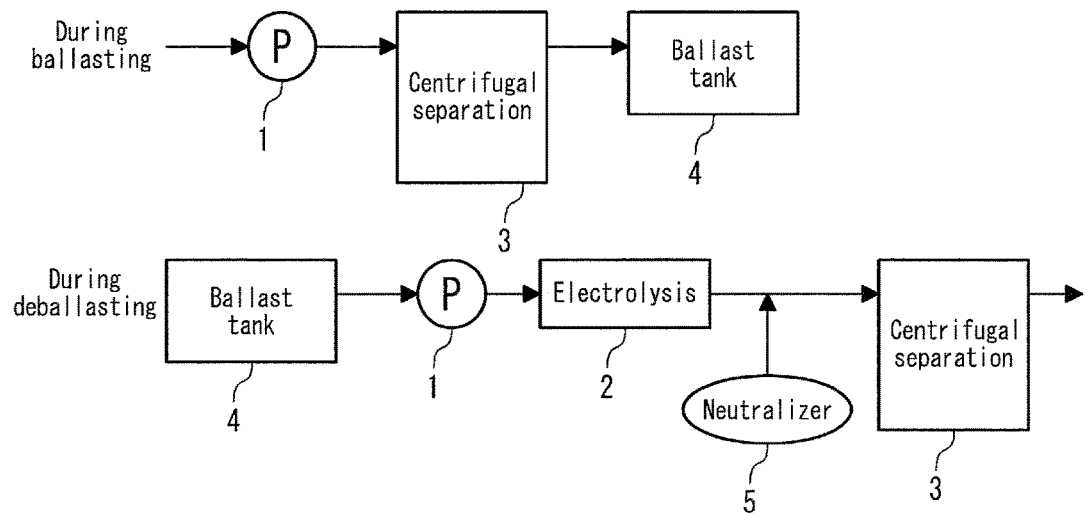
FIG. 8 is a schematic block diagram to be used for describing a method for treating ballast water in Embodiment 6.

FIG. 8 is a schematic diagram for describing a method for treating ballast water in Embodiment 6 of the present disclosure. The method for treating ballast water in Embodiment 6 can be carried out in the same manner as in the method for treating ballast water of Embodiment 5 except that the inactivating treatment by the electrolysis unit 2 is not carried out during ballasting.

According to the method for treating ballast water of Embodiment 6, since the physical treatment using a centrifugal force by the centrifugal separator 3 is carried out during ballasting (the storage step), even when no filter is used, for example, even when highly chlorine-resistant aquatic organisms are contained, the ballast water can be treated sufficiently to the level that meets the ballast water discharge standard. Furthermore, according to the method for treating ballast water of Embodiment 6, since the inactivating treatment by the electrolysis unit 2 is carried out during deballasting (the discharge step) and the treated liquid containing a neutralizer added thereto is introduced into the centrifugal separator 3, a chlorine-containing substance produced in the electrolysis unit 2 and the added neutralizer are stirred well in the centrifugal separator 3 and thereby the neutralizing treatment can be carried out efficiently. Moreover, for example, sludge that leaked from inside the ballast tank 4 and scales peeled from the electrodes of the electrolysis unit 2 are separated in the centrifugal separator 3, which can prevent them from being discharged outside the housing. Furthermore, according to the method for treating ballast water of Embodiment 6, since the inactivating treatment by the electrolysis unit 2 is not carried out during ballasting (the storage step), the impact on the epoxy coatings of, for example, the ballast tank 4 can be reduced, which allows the life of the ballast tank 4, piping, etc. to be prolonged.

In Embodiment 6, the description was made with reference to a configuration, as an example, in which a means for adding the neutralizer is connected to a pipe that connects the electrolysis unit 2 and the centrifugal separator 3 to each other, but the configuration is not limited thereto. It may be a configuration in which the neutralizer addition means 5 is connected to a pipe that connects the centrifugal separator 3 and a ballast pump 1 to each other. In this case, after the chlorine-containing substance was stirred well by the centrifugal separator 3 and thereby the inactivating treatment was carried out efficiently, the stirring effect of the swirling flow generated in the centrifugal separator 3 allows the neutralizer added near the outlet of the centrifugal separator 3 to react efficiently with the remaining chlorine-containing substance. Therefore, according to this configuration, the inactivating treatment using the chlorine-containing substance and the neutralizing treatment using the neutralizer can be carried out more efficiently. It is preferable that the neutralizer addition means 5 be connected to a place located immediately after the supernatant outlet of the centrifugal separator 3 from the viewpoint of efficiently utilizing the swirling flow generated in the centrifugal separator 3. As shown in FIG. 3, it is preferable that the neutralizer addition means 5 be connected, with the supernatant outlet pipe of the centrifugal separator 3 not being bent. The length of the pipe between the centrifugal separator 3 and the place to which the neutralizer addition means 5 is connected is preferably 5 m or shorter, more preferably 1 m or shorter, from the viewpoint of more efficiently utilizing the swirling flow generated in the centrifugal separator 3. Furthermore, in the case where the neutralizer is added as a solid, the stirring effect of the centrifugal separation allows it to be dissolved in water easier.

Embodiment 7

Figure 9:
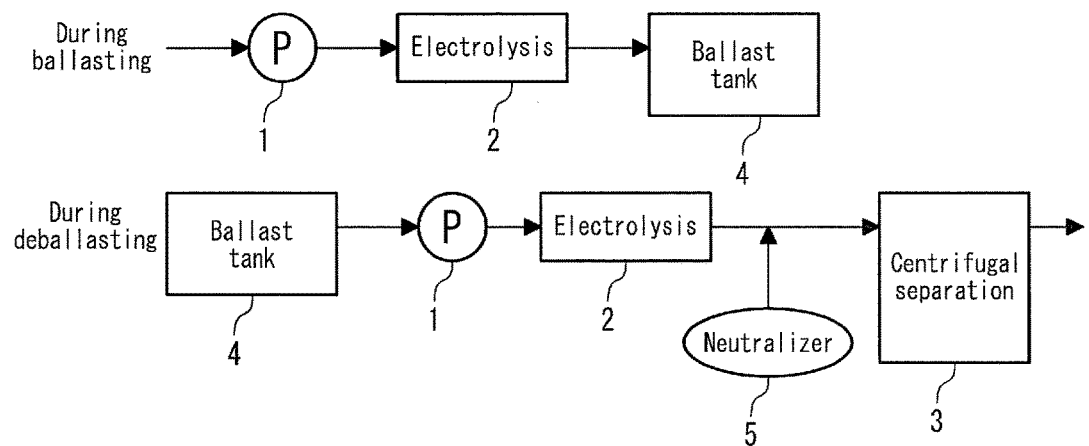
FIG. 9 is a schematic block diagram to be used for describing a method for treating ballast water in Embodiment 7.

FIG. 9 is a schematic diagram for describing a method for treating ballast water in Embodiment 7 of the present disclosure. The method for treating ballast water in Embodiment 7 can be carried out in the same manner as in the method for treating ballast water of Embodiment 5 except that the physical treatment by the centrifugal separator 3 is not carried out during ballasting.

According to the method for treating ballast water of Embodiment 7, since the inactivating treatment by the electrolysis unit 2 is carried out during ballasting (the storage step), propagation or growth of aquatic organisms in the ballast tank 4 can be prevented. Furthermore, according to the method for treating ballast water of Embodiment 7, since the inactivating treatment by the electrolysis unit 2 is carried out during deballasting (the discharge step) and the treated liquid containing a neutralizer added thereto is introduced into the centrifugal separator 3, a chlorine-containing substance produced in the electrolysis unit 2 and the added neutralizer are stirred well in the centrifugal separator 3 and thereby the neutralizing treatment can be carried out efficiently. Moreover, for example, sludge that leaked from inside the ballast tank 4 and scales peeled from the electrodes of the electrolysis unit 2 are separated in the centrifugal separator 3, which can prevent them from being discharged outside the housing. Furthermore, according to the method for treating ballast water of Embodiment 7, since the centrifugal separation treatment is not carried out during ballasting (the storage step), the ballast water is supplied to the ballast tank 4 with the concentrated liquid not being separated by the centrifugal separation treatment. Thus, the time required for storing the ballast water in the ballast tank 4 can be shortened and thereby the loading efficiency can be improved.

In Embodiment 7, the description was made with reference to a configuration, as an example, in which a means for adding the neutralizer is connected to a pipe that connects the electrolysis unit 2 and the centrifugal separator 3 to each other, but the configuration is not limited thereto. It may be a configuration in which the neutralizer addition means 5 is connected to a pipe that connects the centrifugal separator 3 and a ballast pump 1 to each other. In this case, after the chlorine-containing substance was stirred well by the centrifugal separator 3 and thereby the inactivating treatment was carried out efficiently, the stirring effect of the swirling flow generated in the centrifugal separator 3 allows the neutralizer added near the outlet of the centrifugal separator 3 to react efficiently with the remaining chlorine-containing substance. Therefore, according to this configuration, the inactivating treatment using the chlorine-containing substance and the neutralizing treatment using the neutralizer can be carried out more efficiently. It is preferable that the neutralizer addition means 5 be connected to a place located immediately after the supernatant outlet of the centrifugal separator 3 from the viewpoint of efficiently utilizing the swirling flow generated in the centrifugal separator 3. As shown in FIG. 3, it is preferable that the neutralizer addition means 5 be connected, with the supernatant outlet pipe of the centrifugal separator 3 not being bent. The length of the pipe between the centrifugal separator 3 and the place to which the neutralizer addition means 5 is connected is preferably 5 m or shorter, more preferably 1 m or shorter, from the viewpoint of more efficiently utilizing the swirling flow generated in the centrifugal separator 3. Furthermore, in the case where the neutralizer is added as a solid, the stirring effect of the centrifugal separation allows it to be dissolved in water easier.

EXAMPLES

Example 1

Figure 10:
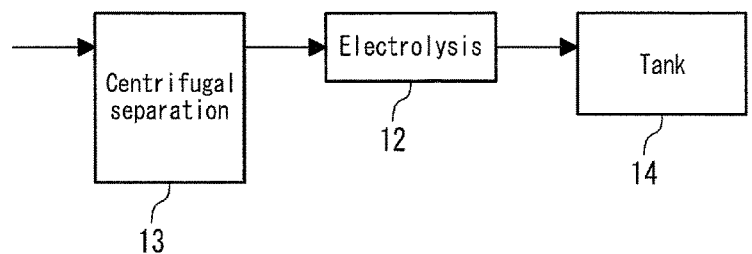
FIG. 10 is a schematic block diagram of test equipment that was used in examples.

Using the device shown in FIG. 10, after a water to be treated was subjected to centrifugal separation using a liquid cyclone 13, the liquid to be treated, which had been subjected to the centrifugal separation, was electrolyzed with an electrolysis unit 12 to produce a chlorine-containing substance and thereby an inactivating treatment was carried out. The liquid thus treated was stored in a tank 14. Five days after the treatment, conches and bivalves with a size of at least 50 μm that were present in 500 L of the treated liquid were checked and the number of survivors was measured. Furthermore, the concentrated liquid in the liquid cyclone was collected and the number of the conches and bivalves contained in the concentrated liquid was measured. An example of the results is shown in Table 1 below. The inlet flow rate in the liquid cyclone was 2.5 to 3.0 m/sec, and the liquid to be treated, which was used herein, was seawater collected in Saeki-shi, Oita. Moreover, the liquid cyclone used herein had a ratio of the conical portion length (H) to the cylindrical portion diameter (D) of 4.5.

TABLE 1

| | | | Liquid Cyclone | | | | Residual Chlorine | | Treated Liquid | | Concentrated |
| | | | Flow Rate | | Pressure | | Concentration | | (500 L) | | Liquid |
| | | Electrode | | Concentrated | Inlet | Outlet | Pressure | Immediately | 5 Days | Conches + Bivalves | | Conches + |
| Test No. | Anode | Cathode | Supernatant L/min | Liquid L/min | Pressure MPa | Pressure MPa | Loss MPa | After mg/L | After mg/L | Number of Survivors | Total | Bivalves Total |
|---|---|---|---|---|---|---|---|---|---|---|---|---|
| 1 | Mesh | Mesh | 194 | 3.4 | 0.14 | 0.071 | 0.069 | 7.33 | 2.88 | 0 | 18 | 985 |
| 2 | Plate | Plate | 194 | 3.4 | 0.14 | 0.071 | 0.069 | 6.9 | 1.49 | 0 | 8 | 1157 |
| 3 | Mesh | Mesh | 194 | 3.4 | 0.14 | 0.071 | 0.069 | 7.03 | 1.83 | 0 | 6 | 1235 |
| 4 | Plate | Plate | 194 | 3.4 | 0.14 | 0.071 | 0.069 | 7.33 | 2.4 | 0 | 16 | 1894 |
| 5 | Mesh | Mesh | 196 | 3 | 0.15 | 0.073 | 0.077 | 6.95 | 1.93 | 0 | 10 | 1575 |
| 6 | Plate | Plate | 198 | 3 | 0.15 | 0.072 | 0.078 | 6.95 | 1.61 | 0 | 2 | 272 |
| 7 | Mesh | Mesh | 194 | 3.3 | 0.15 | 0.075 | 0.075 | 7.08 | 2.18 | 4 | 55 | 4904 |
| 8 | Plate | Plate | 193 | 2.7 | 0.15 | 0.075 | 0.075 | 7.25 | 2.38 | 1 | 25 | 3777 |
| 9 | Mesh | Mesh | 167 | 3.7 | 0.11 | 0.056 | 0.054 | 7.2 | 3.13 | 0 | 34 | 995 |
| 10 | Mesh | Mesh | 172 | 4 | 0.12 | 0.06 | 0.06 | 7.1 | 2.53 | 0 | 7 | 720 |

As shown in Table 1, a large number of shellfishes contained in the liquid to be treated were separated by the liquid cyclone. Furthermore, many of the shellfishes contained in the liquid to be treated were annihilated by the chlorine treatment with chlorine compounds containing available chlorine after the centrifugal separation. The survival rate of the shellfishes in the liquid that had been subjected to the centrifugal separation and the chlorine treatment was low and the number of living shellfishes contained therein was 4 or less.

Example 2

Using a liquid cyclone, 500 L of water to be treated was subjected to centrifugal separation and the supernatant and the concentrated liquid were collected. The shellfishes contained in the supernatant and the concentrated liquid thus collected were measured. The results are shown in Table 2 below. The inlet flow rate in the liquid cyclone was as shown in Table 2 below and the liquid to be treated, which was used herein, was seawater collected in Saeki-shi, Oita. Furthermore, the liquid cyclone used herein had a ratio of the conical portion length (H) to the cylindrical portion diameter (D) of 4.5.

TABLE 2

| Experimental Example | | Supernatant | Concentrated Water | Separation Rate |
|---|---|---|---|---|
| | Inlet Flow Rate 2.8 m/sec Flow Ratio of Supernatant: Concentrated Liquid = 97:3 | | | |
| 1 | Bivalves | 0 | 27,300 | 100.0% |
| | Copepods | 16,500 | 2,700 | 14.1% |
| | Inlet Flow Rate 3.2 m/sec Flow Ratio of Supernatant: Concentrated Liquid = 97.2:2.5 | | | |
| 2 | Bivalves | 0 | 30,900 | 100.0% |
| | Copepods | 16,500 | 2,700 | 14.1% |

TABLE 2-continued

| Experimental Example | | Supernatant | Concentrated Water | Separation Rate |
|---|---|---|---|---|
| | Inlet Flow Rate 3.3 m/sec Flow Ratio of Supernatant: Concentrated Liquid = 97.5:2.5 | | | |
| 3 | Bivalves | 1,250 | 22,800 | 94.8% |
| | Copepods | 71,250 | 12,000 | 14.4% |
| | Inlet Flow Rate 2.9 m/sec Flow Ratio of Supernatant: Concentrated Liquid = 98:3 | | | |
| 4 | Bivalves | 500 | 37,500 | 98.7% |
| | Copepods | 102,750 | 7,500 | 6.8% |

As shown in Table 2, most bivalves were separated by the liquid cyclone. Copepods are difficult to separate by the centrifugal separation as compared to the bivalves. However, since they have low chlorine resistance, they are inactivated easily by the addition of a chlorine-containing substance. Thus, the liquid to be treated can be treated sufficiently to the level that meets the ballast water discharge standard.

Example 3

Using two types of liquid cyclones (Test Units 1 and 2) shown in Table 3 below, 1000 L of water to be treated was subjected to centrifugal separation under the conditions shown in Table 3 below and then the supernatant was collected. The shellfishes contained in the supernatant thus collected were measured and with the number of shellfishes thus measured (the total number in the treated liquid) and the number of shellfishes contained in the concentrated water (the total number in the concentrated water), the separation rate was calculated by the following formula. The results are shown in Table 3 below. The liquid to be treated, which was used herein, was seawater collected in Saeki-shi, Oita.

Separation Rate (%)=100−(the total number in the treated liquid)/(the total number in the concentrated water)*100

TABLE 3

| Test Unit | Diameter of Cylindrical Portion D m | Length of Conical Portion H m | H/D | Flow Rate Q L/min | Differential Pressure $\Delta P1$ MPa | Total Number in Treated Liquid/1m3 | | Separation Rate % | Separation Rate Range Throughout Experiment % |
|---|---|---|---|---|---|---|---|---|---|
| | | | | | | Bivalves Number of | Conches Number of | | |
| 1 | 0.11 | 0.25 | 2.3 | 203 | 0.067 | 6 | 4 | 85 | 80~85 |
| 1 | 0.11 | 0.25 | 2.3 | 201 | 0.067 | 9 | 4 | 83 | |
| 1 | 0.11 | 0.25 | 2.3 | 252 | 0.06 | 8 | 1 | 81 | |
| 2 | 0.11 | 0.5 | 4.5 | 212 | 0.038 | 1 | 5 | 90 | 90~100 |
| 2 | 0.11 | 0.5 | 4.5 | 197 | 0.055 | 0 | 1 | 99 | |
| 2 | 0.11 | 0.5 | 4.5 | 170 | 0.057 | 2 | 1 | 99 | |
| 1 | 0.11 | 0.25 | 2.3 | 180 | 0.203 | 166 | 2 | 65 | 65~85 |
| 1 | 0.11 | 0.25 | 2.3 | 195 | 0.203 | 78 | 9 | 74 | |
| 1 | 0.11 | 0.25 | 2.3 | 198 | 0.204 | 94 | 3 | 72 | |
| 1 | 0.11 | 0.25 | 2.3 | 190 | 0.009 | 89 | 11 | 62 | 60~70 |
| 1 | 0.11 | 0.25 | 2.3 | 200 | 0.007 | 34 | 48 | 64 | |
| 1 | 0.11 | 0.25 | 2.3 | 203 | 0.009 | 18 | 35 | 69 | |

As shown in Table 3, both the liquid cyclones of Test Units 1 and 2 were able to separate shellfishes at a separation rate exceeding 60%. The liquid cyclone (Test Unit 2) with a H/D ratio of 4.5 had a higher separation rate than that of the liquid cyclone (Test Unit 1) with a H/D ratio of 2.3. Furthermore, a differential pressure set to 0.01 to 0.1 MPa allowed the separation rate to be improved.

What is claimed is:

1. A method for treating ballast water from seawater for storage inside a ship, comprising:
   supplying a whole amount of seawater taken in from outside a ship to an electrolytic cell,
   carrying out an aquatic organism-inactivating treatment by electrolyzing the seawater in the electrolytic cell to produce a chlorine-containing substance,
   carrying out a treatment by a liquid cyclone with respect to the seawater that has been subjected to the inactivating treatment so that the chlorine-containing substance is stirred in the seawater and the seawater is separated into a supernatant and a concentrated liquid, and
   storing the supernatant in a ballast tank located inside the ship.

2. The method according to claim 1, wherein a flow velocity of the liquid flowing into the liquid cyclone is 2.5 to 3.3 m/sec.

3. The method according to claim 1, wherein the concentrated liquid has a higher solid content concentration than that of the supernatant.

4. The method according to claim 1, wherein the concentrated liquid comprises at least one of aquatic organisms with a shell whose height is at least 50 μm and aquatic organisms with a shell whose aspect ratio (shell length/shell height) is 0.1 to 10.

5. The method according to claim 1, wherein a concentration of the chlorine-containing substance contained in the liquid in the electrolytic cell is 0.1 mg/L to 20 mg/L.

* * * * *